(12) United States Patent
Yang

(10) Patent No.: US 11,333,923 B2
(45) Date of Patent: May 17, 2022

(54) DISPLAY PANEL MODULE

(71) Applicant: Wuhan China Star Optoelectronics Technology Co., Ltd., Hubei (CN)

(72) Inventor: Yong Yang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 209 days.

(21) Appl. No.: 16/637,843

(22) PCT Filed: Sep. 17, 2019

(86) PCT No.: PCT/CN2019/106275
§ 371 (c)(1),
(2) Date: Feb. 10, 2020

(87) PCT Pub. No.: WO2021/003842
PCT Pub. Date: Jan. 14, 2021

(65) Prior Publication Data
US 2022/0004056 A1 Jan. 6, 2022

(30) Foreign Application Priority Data

Jul. 5, 2019 (CN) .......................... 201910602079.8

(51) Int. Cl.
*G02F 1/13357* (2006.01)
*G02F 1/1333* (2006.01)
*G02F 1/1335* (2006.01)

(52) U.S. Cl.
CPC .... *G02F 1/133603* (2013.01); *G02F 1/13338* (2013.01); *G02F 1/133512* (2013.01); *G02F 1/133514* (2013.01)

(58) Field of Classification Search
CPC ........... G02F 1/133603; G02F 1/13338; G02F 1/133512; G02F 1/133514
(Continued)

(56) References Cited

U.S. PATENT DOCUMENTS 10,712,609 B1 * 7/2020 Yen ...................... G02F 1/1336
10,768,356 B1 * 9/2020 Zhang .................. G02B 6/0035
(Continued)

FOREIGN PATENT DOCUMENTS

CN 109215587 A 1/2019
CN 109257470 A 1/2019
(Continued)

*Primary Examiner* — Charles S Chang
(74) *Attorney, Agent, or Firm* — Luedeka Neely Group P.C.; Rick Barnes

(57) ABSTRACT

A display panel module including a display panel is provided, which defines a camera region. A backlight assembly disposed under the display panel, and a camera disposed under the backlight assembly; the backlight assembly includes a circuit board and light source units disposed on the circuit board at intervals; the circuit board in the backlight assembly is inclined downward and recessed at a position corresponding to the camera region to form a hollow funnel shape with a larger top opening and a smaller bottom opening; the top opening of the hollow funnel adjacent to the display panel is defined as a first opening, and the bottom opening adjacent to the camera is defined as a second opening; and light incident from outside can enter the camera through the first and second openings. The invention provides a display panel module, which provides a novel under-screen camera solution.

10 Claims, 3 Drawing Sheets

(58) Field of Classification Search
USPC .................................................... 349/61–70
See application file for complete search history.

(56) References Cited

U.S. PATENT DOCUMENTS

| | | |
|---|---|---|
| 2007/0047228 A1 | 3/2007 | Thompson et al. |
| 2009/0190059 A1* | 7/2009 | Ra .......................... G06F 3/0425 |
| | | 349/116 |
| 2019/0227383 A1 | 7/2019 | Wu et al. |
| 2021/0072599 A1* | 3/2021 | Mei ................... G02F 1/133528 |
| 2021/0088842 A1* | 3/2021 | Takimoto ............ H04M 1/0266 |

FOREIGN PATENT DOCUMENTS

| | | |
|---|---|---|
| CN | 208384933 U | 1/2019 |
| CN | 208672966 U | 3/2019 |
| CN | 208672986 U | 3/2019 |
| CN | 109946880 A | 6/2019 |

\* cited by examiner

DISPLAY PANEL MODULE

FIELD OF INVENTION

The present invention relates to the field of flat display technology, and more particularly, to a display panel module, which provides an under-screen camera solution.

BACKGROUND OF INVENTION

It is known that with continuous development of low temperature poly-silicon (LTPS) small-size display technology, full-screen technology has become a mainstream technology in the mobile phone market.

But until now, the "full screen" promoted in the market is still a pseudo full screen, that is, it just has a higher screen ratio, but it is not a "full screen" in the true sense. For this, the industry has developed a variety of technologies such as "notch type" full screen, "widow's peak type" full screen, and "blind hole type" full screen, which are derived from the goal of full screens. Their ever-increasing screen ratios are also pushing the full-screen technology to the extreme.

However, the three full-screen technologies mentioned above still need to drill a part of the display screen or cut the display screen in special shapes to expose a location region of the camera so that it allows outside light to enter for taking pictures. Therefore, this is one of the main reasons why these three technical solutions cannot achieve a true full-screen display solution.

For this reason, people have also tried to further increase the screen ratio by using the camera region for display. However, in the industry, there is currently no good solution on how to achieve a perfect combination of camera shooting and normal display of the region where the camera is located.

Technical Problem

According to one aspect of the present invention, a display panel module is provided, which adopts a novel panel structure and a backlight assembly structure in combination with a plurality of camera units disposed under the display panel, thereby providing a new type of under-screen camera solution.

SUMMARY OF INVENTION

The technical scheme adopted by the present invention is as follows: A display panel module, including a display panel which defines a camera area. A backlight assembly (BLU) is disposed under the display panel, and a camera is disposed under the backlight assembly; wherein the backlight assembly includes a circuit board and a plurality of light source units disposed on the circuit board at intervals; wherein the circuit board in the backlight assembly is inclined downward and recessed at a position corresponding to the camera region to form a hollow funnel shape with a top opening which is larger and a bottom opening which is smaller; wherein the top opening of the hollow funnel adjacent to the display panel is defined as a first opening, and the bottom opening adjacent to the camera is defined as a second opening; and wherein a light incident from outside of the display panel can enter the camera through the first opening and the second opening for taking pictures.

Further, in a different embodiment, a diameter of the second opening is equal to or smaller than a diameter of the camera.

Further, in a different embodiment, an aperture of the second opening is smaller than an aperture of the camera by 0-4 mm.

Further, in different embodiments, an inclination angle θ of the hollow funnel shape of the circuit board is in a range of 30°-70°. That is, the cross-section of the hollow funnel shape is an isosceles inverted trapezoid, and the inclination angle is 30°-70°. Specifically, it can be 35°, 45°, 50°, 60°, 65°, etc., and it can be determined according to actual needs and is not limited.

Further, in different embodiments, a vertical depth of the hollow funnel shape of the circuit board is 50-600 μm.

Further, in a different embodiment, one to ten rows of the light source units are arranged in an inclined manner at intervals on an inclined inner sidewall of the hollow funnel shape, and the light source units in each row are arranged in a circle. The light source unit can be a mini-LED light source unit but is not limited thereto.

Further, in a different embodiment, a light-emitting angle of the light source unit provided on the circuit board ranges from 130 to 170 degrees. It is preferably about 160 degrees but is not limited thereto.

Further, in a different embodiment, the light source units provided on the inclined inner sidewall of the hollow funnel shape are individually controlled for each row of the light source units.

Further, in a different embodiment, the light source units provided on the inclined inner sidewall of the hollow funnel shape are individually controlled for each light source unit.

Further, in a different embodiment, driving voltages of the light source units in different rows provided on the inclined inner sidewall of the hollow funnel shape are different.

Further, in a different embodiment, the light source units provided on the circuit board corresponding to the camera region are RGB three-color mini-LED light source units arranged in turn at intervals.

Further, in a different embodiment, the display panel includes an array substrate, a liquid crystal cell, and a CF substrate. The liquid crystal cell can be one of PDLC or PNLC but is not limited thereto.

Further, in a different embodiment, the CF substrate includes sequentially disposed substrate glass, a photoresist layer, and a planarization layer (OC layer); wherein the photoresist layer in the camera region includes BM layer units arranged at intervals, and a transparent photoresist layer unit is arranged between the BM layer units, and alternatively, the planarization layer directly fills positions between the BM layer units.

Beneficial Effect

The invention relates to a display panel module, which adopts a novel panel structure and a backlight assembly structure in combination with a plurality of camera units disposed under the display panel, thereby providing a new type under-screen camera solution.

Further, the backlight assembly adopts a hollow funnel shape in a camera region so that external light can directly enter the camera thereunder, thereby the camera can perform normal shooting. In order to further ensure better shooting quality of the camera, the CF substrate of the display panel uses a new type photoresist layer structure in the camera region. Compared to three-color photoresist layer units that are usually arranged between BM layer units, the present application uses a transparent photoresist layer unit instead, or directly fills space between the BM layer units with a planarization layer. This change corresponds to the under-screen camera solution in the present application, and more external light can be prevented from being blocked by a color photoresist layer unit. With the transparent photoresist layer unit, light can more easily enter the display panel, so as to provide the camera with more sufficient light for taking pictures, thereby improving the shooting effect In addition, since the backlight assembly adopts the hollow funnel structure in the camera region, which is an inclined shape, this causes light output to be uneven in the camera region. In order to ensure a normal display effect, the present application adopts three-color mini-LEDs as a backlight in the camera region, and the mini-LED light source units at the inclined sidewall position of the funnel shape are arranged in an annular array. In addition, a driving voltage of each row of mini-LED light source units on the sidewall, or even a driving voltage of each mini-LED light source, are controlled, and the driving voltage of each row of mini-LED light sources is adjusted to make light emission intensity thereof different. Finally, the light output of each row of light source units at the opening (i.e. the first opening) on the funnel shape is uniformized, thereby ensuring the display effect at the camera region.

DESCRIPTION OF DRAWINGS

In order to more clearly illustrate the technical solutions in the embodiments of the present invention, the following figures described in the embodiments will be briefly introduced. It is obvious that the drawings described below are merely some embodiments of the present invention, and other drawings can also be obtained by a person of ordinary skill in the field based on these drawings without doing any creative activity.

DETAILED DESCRIPTION OF PREFERRED EMBODIMENTS

The technical solution of a display panel module according to the present invention will be described in further detail below with reference to the drawings and embodiments.

Figure 1:
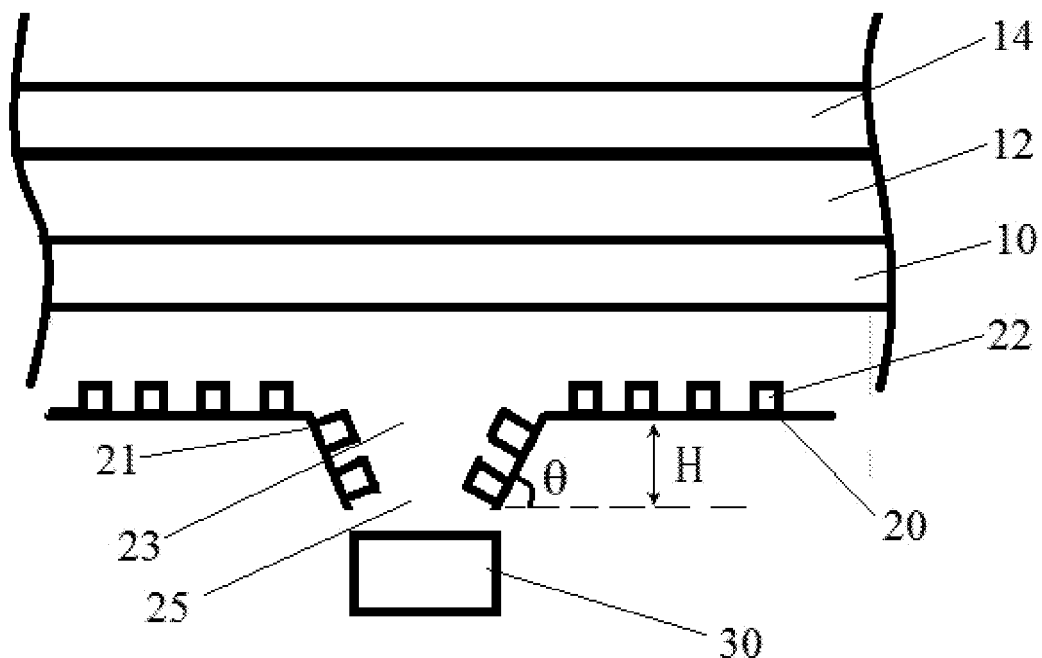
FIG. 1 is a schematic diagram of a partial structure of a display panel module provided in an embodiment of the present invention, wherein only a cross-sectional structure at a position of a camera region is illustrated.

Please refer to FIG. 1, an embodiment of the present invention provides a display panel module, which includes a display panel, a backlight assembly, and a camera 30. The display panel defines a camera region, which includes an array substrate 10, a liquid crystal cell 12, and a CF substrate 14. The liquid crystal cell 12 may be one of PDLC or PNLC, but is not limited thereto.

Figure 2:
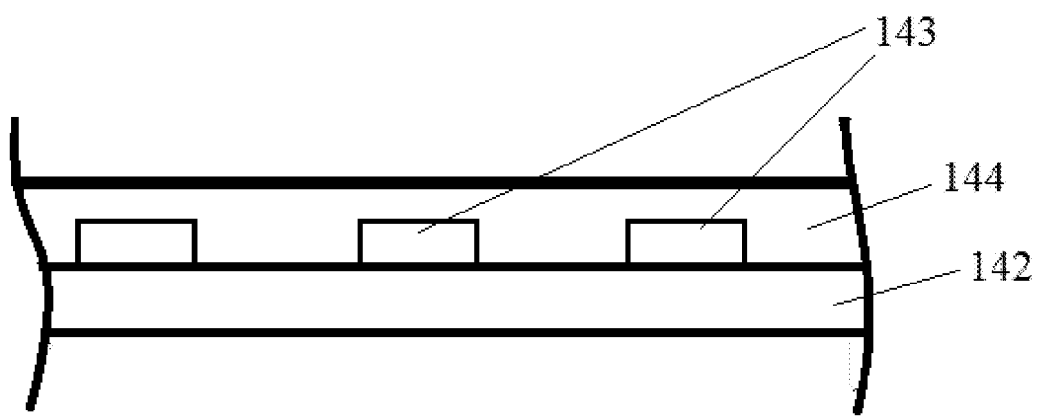
FIG. 2 is a schematic diagram of a partial structure of a CF substrate in the display panel shown in FIG. 1, wherein only a cross-sectional structure at a position of the camera region is illustrated.

Further, please refer to FIG. 2, the CF substrate includes a substrate glass 142, a photoresist layer, and a planarization layer 144, wherein the photoresist layer in the camera region includes BM layer units 143 arranged at intervals. Compared to the three-color photoresist layer units that are usually arranged between the BM layer units 143, the present application uses a transparent photoresist layer unit instead, or as shown in the figure, directly fills the space between the BM layer units 143 with the planarization layer 144.

Figure 3:
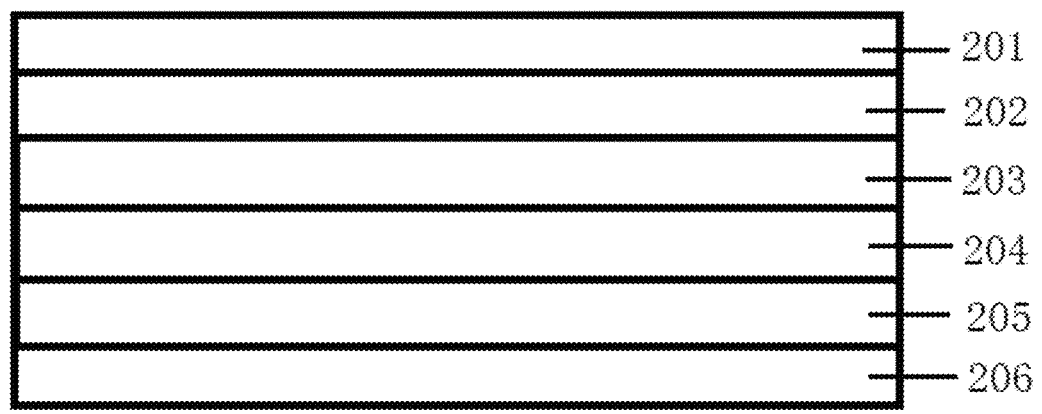
FIG. 3 is a schematic structural diagram of a circuit board of the backlight assembly shown in FIG. 1.

The backlight assembly includes a circuit board 20 and a plurality of light source units 22 disposed thereon, wherein the light source units 22 are preferably mini-LEDs but are not limited thereto. Please refer to FIG. 3, it illustrates a structure of the circuit board 20, which includes a white ink layer 201, a copper wiring layer 202, a first adhesive layer 203, a PI layer 204, a second adhesive layer 205, and a bottom copper layer 206, which are sequentially stacked.

Further, please refer to FIG. 1, wherein the circuit board 20 in the backlight assembly is inclined downward and recessed at a position corresponding to the camera region to form a hollow funnel shape with a top opening which is larger and a bottom opening which is smaller.

A shape of the hollow funnel is an annular configuration with a certain inclined angle, which is formed by being surrounded by an annular-shaped inclined sidewall 21, and the top and bottom openings are formed at both ends. The top opening adjacent to the display panel is defined as first opening 23, and the bottom opening adjacent to the camera is defined as second opening 25, and a pattern of cross-sectional between them is preferably an inverted isosceles trapezoid, and its inclination angle θ ranges from 30°-70°. Specifically, the inclination angle θ can be 35°, 45°, 50°, 60°, 65°, and the like, and may be determined as needed without limitation.

Further, an aperture of the second opening 25 is equal to or less than that of the camera 30. When the aperture of the second opening 25 is less than that of the camera 30, the aperture of the second opening is kept less than that of the camera 30 by 0-4 mm, preferably in the range of about 1-2 mm, so as to remove an unnecessary position of a camera frame region of the camera 30.

Further, a vertical depth H of the hollow funnel shape is 50-600 μm, and the specific value can be adjusted according to an actual application. According to a specific selection of the depth H and the inclination angle θ, a number of rows of the light source units 22 arranged at intervals on the inclined inner sidewall 21 is different and can be specifically selected within a range of 1-10 rows.

Further, since the sidewall 21 is disposed inclinedly, this makes the distances between each row of the light source units 22 disposed thereon and the first opening 23 different. Taking mini-LEDs as the light source units 22 for an example, if the rows of mini-LED light source units are driven by the same driving voltage, the light output of each row of the mini-LED light source units at a position of the first opening 23 will be uneven, as these light source units are located in different rows, thereby further affecting the display effect of the display panel in the camera region.

To solve this problem, the present invention adopts a method of individually controlling each light source unit 22 or each row of the light source units 22 provided on the annular inner sidewall 21. In the following description, each light source unit 22 is controlled individually as an example.

Specifically, first, the mini-LED light source units provided at the inner sidewall 21 adopt three-color RGB light source units and are arranged in turn at intervals in each row. For example, a row of red mini-LED light source units, a row of green mini-LED light source units, a row of blue mini-LED light source units, and so on.

Then, each mini-LED light source unit 22 provided on the annular inclined inner sidewall 21 is driven to emit light by an initial driving voltage, and the brightness and chromaticity of each point are monitored. The chromaticity and grayscale of the monitored points are corrected according to the chromaticity and grayscale of an image to be output at each point. Next, the driving voltage of each RGB LED on the sidewall is adjusted correspondingly, and a correction result is inputted to an IC terminal to drive a single LED so that it gives different driving voltages to different light source units 22. In this way, the display panel region corresponding to the camera region outputs a normal image. In terms of partition design, the light source unit 22 at the position of the annular inclined inner sidewall 21 needs to be designed as a single partition to achieve single control, and the partition result is different from the partition of the light source units at other regions corresponding to non-camera regions.

Figure 4:
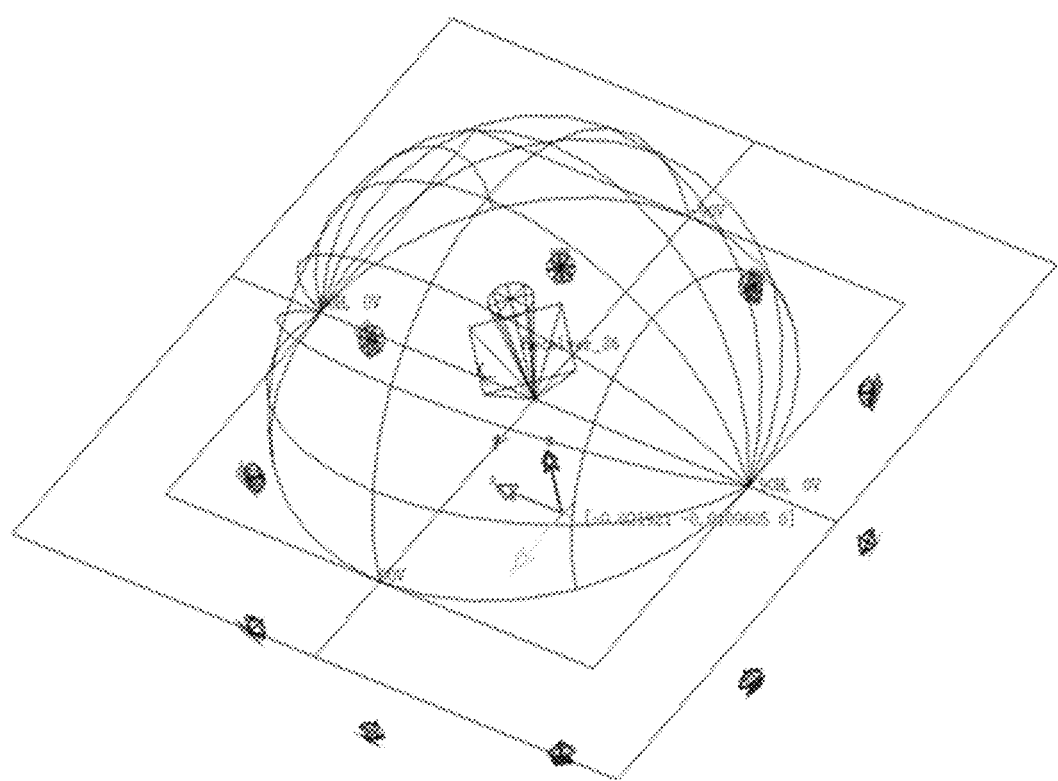
FIG. 4 is a simulation architecture diagram of the structure shown in FIG. 1 by using simulation software.

Further, please refer to FIG. 4, which is based on the concept of the present invention to simulate the light output and related influence parameters at the "funnel structure" shown in FIG. 1 by suitable optical simulation software. As shown in the figure, the simulation architecture includes an annular array light source thereunder, which simulates a mini-LED light source, and a receiving surface thereover, which simulates the light reception situation at an aperture. The light output at the upper aperture is simulated by controlling the number of light sources in the annular belt, the tilt angle of the light sources, the light-emitting angle of the light sources, and the position of the receiving surface from the light sources.

Figure 5:
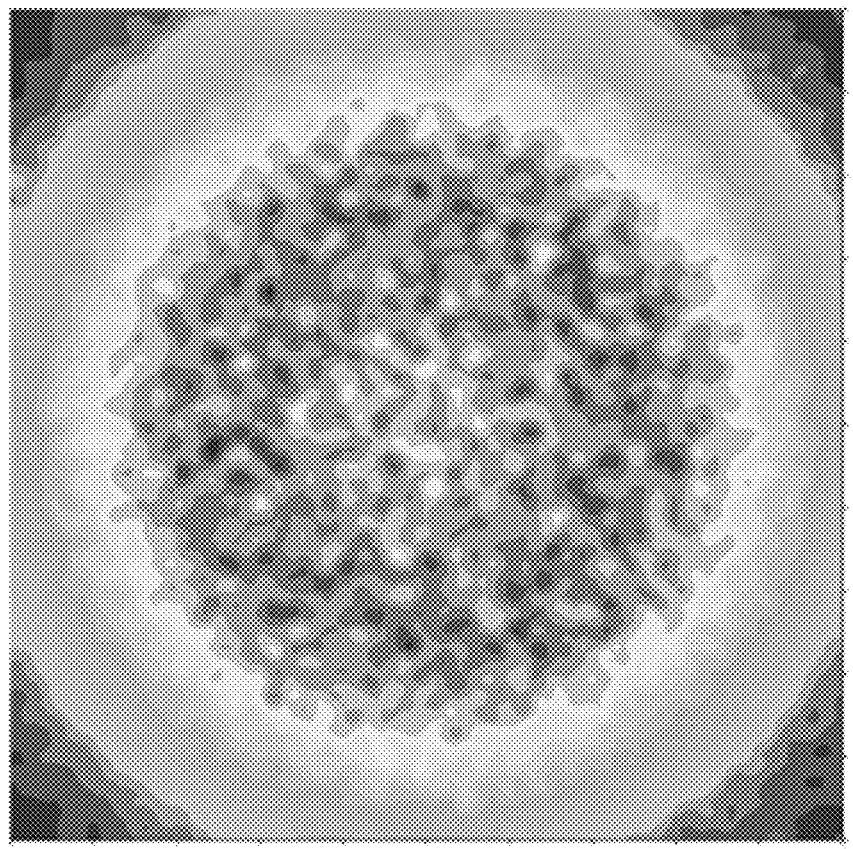
FIG. 5 is a diagram illustrating a simulation result of a light-emitting effect of the simulation architecture shown in FIG. 4.

FIG. 5 is a light output diagram in the simulation result after the simulation architecture parameters are optimized, wherein the light output is most uniform at the aperture in a condition that the number of light sources is 30, the inclination angle $\theta$ is 60°, the light-emitting angle of the light source unit is 160°, and the receiving surface is 1.5 mm away from the array light source. Further, it can be seen from the trend that the greater the number of LED light sources on the annular belt, the appropriate the LED light source inclination angle, the larger the light emission angle, the farther the receiving surface is from the array light source, and the more uniform the light emission is at the aperture position. The simulation result shown in FIG. 5 also shows that the design of uniform light output at the aperture of the camera can be obtained by the "funnel" architecture involved in the present invention shown in FIG. 1.

However, in different embodiments, the "funnel-shaped" structure disclosed in the present application is a creative idea, and the specific structure adopted in the different embodiments is not limited to the simulation structure disclosed above. The above-mentioned diagrams of the simulation model and the uniform light output results disclosed in FIG. 4 and FIG. 5 are only verifications of the concepts involved in the present invention, but not a limitation. Those skilled in the art in the industry can make various specific changes without departing from the creative concept of the present application based on specific actual conditions and the simulation process disclosed in the present application. These changes are all within the scope of the creative idea of the present application.

The invention relates to a display panel module, which adopts a new structure to combine with a camera unit, thereby providing a new type under-screen camera solution.

The backlight assembly adopts a hollow funnel shape in the camera region so that external light can directly enter the camera thereunder, thereby the camera can perform normal shooting. Further, in order to ensure better shooting quality of the camera, the CF substrate of the display panel uses a new type photoresist layer structure in the camera region. Compared to the three-color photoresist layer units that are usually arranged between the BM layer units, the present application uses a transparent photoresist layer unit instead, or directly fills the space between the BM layer units with the planarization layer. This change is for the under-screen camera solution in the present application, and more external light can be prevented from being blocked by the color photoresist layer unit. With the transparent photoresist layer unit, light can more easily enter the display panel, so as to provide the camera with more sufficient light for taking pictures, thereby ensuring its shooting effect.

In addition, since the backlight assembly adopts a hollow funnel structure in the camera region, which is an inclined shape, this causes light output to be uneven in the camera region. In order to ensure the normal display effect, the present application adopts RGB three-color mini-LEDs as the backlight in the camera region, and the mini-LED light source units at the inclined sidewall position of the funnel shape are arranged in an annular array. Further, the driving voltage of each row of the mini-LED light sources on the sidewall, or even the driving voltage of each mini-LED light source, are controlled, and the driving voltage of each row of the mini-LED light sources is adjusted to make the light emission intensity thereof different. Finally, the light output of each row of light source units at the opening (i.e. the first opening) on the funnel shape is uniformized, thereby ensuring the display effect at the camera region.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:
1. A display panel module, comprising:
a display panel comprising a display region and a camera region;
a backlight assembly disposed under the display panel; and
a camera disposed under the backlight assembly;
wherein the backlight assembly comprises a circuit board, and the circuit board comprises a horizontal plane parallel to the display panel and is defined with a funnel-shaped opening structure recessed toward the camera at a position corresponding to the camera region to allow light incident from outside of the display panel to enter the camera, and wherein the funnel-shaped opening structure comprises an inclined inner sidewall; and
wherein a plurality of light source units are arranged on the horizontal plane to provide light source required for the display region and arranged on the inclined inner sidewall to provide light source required for the camera region.

2. The display panel module according to claim 1, wherein an inclination angle $\theta$ of the inclined inner sidewall relative to the horizontal plane ranges from 30 degrees to 70 degrees.

3. The display panel module according to claim 1, wherein a vertical depth of the funnel-shape opening structure ranges from 50 μm to 600 μm.

4. The display panel module according to claim 1, wherein one to ten rows of the plurality of light source units are arranged on the inclined inner sidewall of the funnel-shaped opening structure, and the plurality of light source units in each row are arranged in a circle.

5. The display panel module according to claim 4, wherein the plurality of light source units provided on the inclined inner sidewall of the funnel-shaped opening structure are individually controlled for each row of the plurality of light source units.

6. The display panel module according to claim 4, wherein the plurality of light source units provided on the inclined inner sidewall of the funnel-shaped opening structure are individually controlled for each light source unit.

7. The display panel module according to claim 1, wherein a light-emitting angle of each of the plurality of light source units provided on the inclined inner sidewall of the circuit board ranges from 130 degrees to 170 degrees.

8. The display panel module according to claim 1, wherein the plurality of light source units provided on the inclined inner sidewall of the circuit board are RGB three-color mini-LED light source units arranged in turn at intervals.

9. The display panel module according to claim 1, wherein the display panel comprises an array substrate, a liquid crystal cell, and a CF substrate.

10. The display panel module according to claim 9, wherein the CF substrate comprises a substrate glass, a photoresist layer, and a planarization layer which are sequentially disposed;

wherein the photoresist layer in the camera region comprises BM layer units arranged at intervals, and a transparent photoresist layer unit is arranged between the BM layer units; or alternatively, the planarization layer directly fills positions between the BM layer units.

* * * * *